July 29, 1941. P. A. K. BOEDER 2,250,521
OPHTHALMIC LENS AND PROCESS OF MAKING SAME
Filed Oct. 28, 1938 2 Sheets-Sheet 1
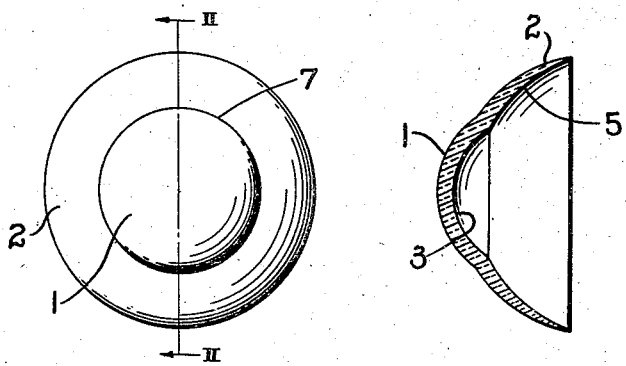
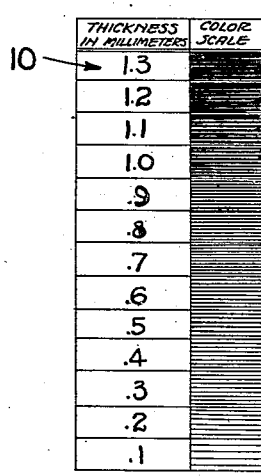
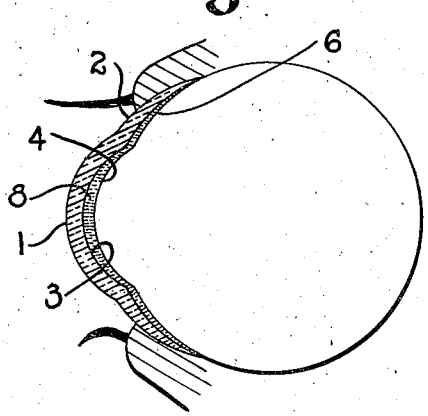
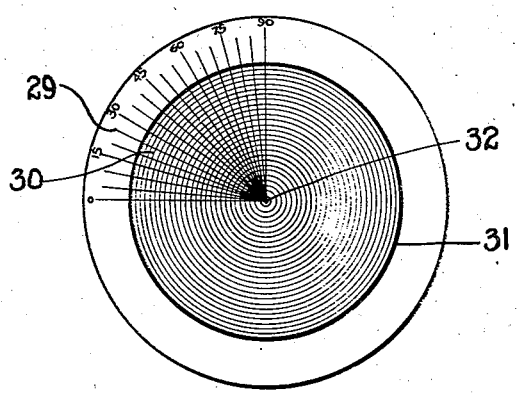
INVENTOR.
PAUL A. K. BOEDER
BY Harry H. Styll.
ATTORNEY.

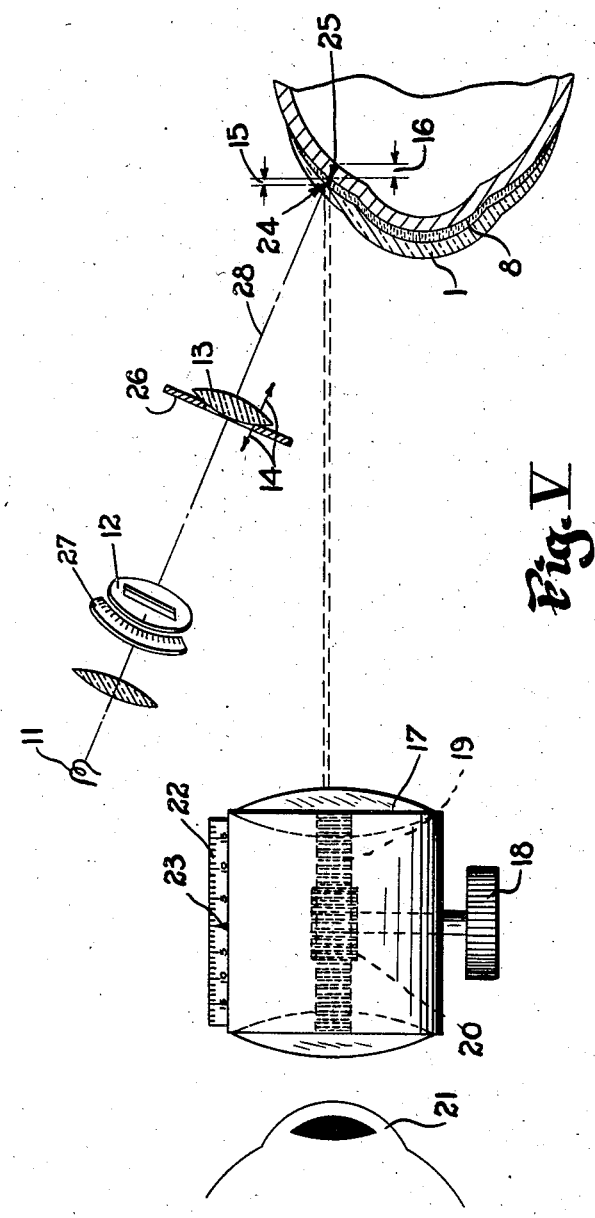

Patented July 29, 1941

2,250,521

UNITED STATES PATENT OFFICE 2,250,521

OPHTHALMIC LENS AND PROCESS OF MAKING SAME

Paul A. K. Boeder, Southbridge, Mass., assignor to American Optical Company, Southbridge, Mass., a voluntary association of Massachusetts Application October 28, 1938, Serial No. 237,505

3 Claims. (Cl. 88—20)

This invention relates to ophthalmic contact lenses and more particular to a process for measuring the curvature of the eyeball for obtaining the bearing surface of contact lenses which is to contact the eyeball.

This application is a continuation in part of my copending application, Serial No. 185,289, filed January 17, 1938.

One of the principal objects of the invention is to provide simple and facile means for measuring or obtaining the curvature of the eyeball so that the bearing surface of a contact lens may be made to fit the eyeball.

Other objects and advantages of the invention are: providing a fitting contact lens to hold the testing medium and facilitate measurement, providing a colored liquid medium not injurious to the eye and whose density of color may be measured when held in place in the eye by the fitting contact lens, providing instrumental means for measuring the density of said color at various thicknesses of the color medium; providing means whereby the variation of color may be noted by the examiner's eye; providing comparative data of curvatures represented by various gradations of color density, and the providing generally of simple, inexpensive and facile means for determining the curvature of the patient's eyeball without undue discomfort to the patient and with a minimum of labor to the practitioner.

Other objects and advantages of the invention will become apparent from the following description taken in connection with the accompanying drawings. It is clear that many modifications and changes may be made in the details of construction and arrangement of parts, and in the steps of the process without departing from the spirit of the invention as expressed in the accompanying claims, hence I do not wish to be held to the exact disclosures made and described as the preferred forms only have been so disclosed and described by way of illustration.

From experience it has been found that probably the most important feature of fitting contact lenses is to get the bearing portion of the lens on the eye to fit comfortably for the patient. The chief defect in contact lenses is the discomfort to the wearer. In many cases their use is painful and the patient can only wear them for limited periods of time. Contact lenses that do not fit cause irritation of the eye and may hence prove dangerous. The chief concern then is to be able to fit the bearing surfaces accurately. To do this simple and efficient means of measuring the eyeball are most desirable. It is, therefore, a principal object of this invention to provide such means that will reduce to a minimum the difficulties of fitting for both the practitioner and the patient.

Referring to the drawings:

Fig. I is a front view of a fitting contact lens of the invention;

Fig. II is a cross-section on line II—II of Fig. I;

Fig. III is a diagrammatic cross-section showing the devices of the invention in place before the eye;

Fig. IV is a diagrammatic face view of a color density chart used in one embodiment of the invention; and Fig. V is a diagrammatic view of a measuring instrument used in another embodiment of the invention.

Fig. VI is a diagrammatic face view of a plotting chart utilized in the invention.

Referring to the drawings in which similar reference characters denote corresponding parts throughout:

I first make a fitting contact lens having the cornea or central portion 1 and the other or sclera portion 2. The inner surface 3 of the portion 1 is made so that when the lens is in place before the eye there is a space between the surfaces 3 and cornea 4 of the eye. The inner surface 5 of the sclera portion 2 is made to fit the curvature 6 of the sclera of the eye and is designed to rest thereon. This inner surface 5 is made to a known curvature, preferably a known spherical surface so it may act as a datum base.

This contact fitting lens may be made of optical glass with the usual ground and polished lens surfaces, or it may be made of a synthetic resin that is transparent and lens like. There are now several of these synthetic compounds on the commercial market such as Plexiglas, Lucite, etc. The lens may be made also of other transparent materials. The cornea and sclera portions may be integral or they may be made of separate pieces until along the line 7, Fig. I. Where made in two pieces, the materials for the separate parts may be different. The sclera part may be made of soft rubber or other substances that will be comfortable to the eye.

The space between the eyeball and the inner surfaces of the contact lens is filled in with a colored liquid 8 which is comfortable to and not harmful to the eye. A desirable liquid is Fluroscene, which has a blue color.

In operation the fitting contact lens is fitted in place before the eye with the colored liquid 8 in place between the eye and the inner surfaces of the lens. The lens is held in place by its edges inserted under the eyelids. It is clear that if there is a variation in curvature of the eyeball, the liquid will be thicker in one place than in another, as the thickness of the liquid varies so will the density of the color vary, the thinner the liquid the lighter the shade.

If the eye is perfectly spherical the thickness and hence the color of the liquid will be centrally uniform, but if the curvature of the eye varies; say from spherical to toric or cylindrical, the variation will be indicated by a change in shade, not only the variation in curvature will be apparent but also the axis of the cylinder or curve variation. As stated the inner surface of the bearing portion of the fitting lens is a curve or sphere of known curvature. This curve or sphere is used as a datum base of determination.

I also prepare a chart of the colors or shades of the liquid 8 for various thicknesses, such a chart is shown diagrammatically in Fig. IV, having a plurality of sections 9 of a color corresponding to the color of the liquid and varied in shades or graded in shade differences corresponding to the shade differences in the color of the liquid produced by different thicknesses of the liquid at given points between the eye and the known spherical curve of the inner surface of the lens. A suitable scale 10 is provided adjacent the differently colored or graded colored sections 9 which give the thickness for the color intensity of the adjacent sections. By placing the colored edge of the chart adjacent to the point at which the thickness of the liquid is to be determined, with or without projecting light thereon for viewing purposes, the chart may be moved upwardly or downwardly until a section 9 of corresponding intensity is aligned with said point. The scale 10 is then read to determine the thickness at said point.

Shade variations may be detected by the practitioner's eye and, by comparison with his chart, the thickness determined and the surface of the eye charted. The eye may be charted through the use of a plotting device, such as shown in Fig. VI. This device is in the form of a protractor having a degree scale 29 thereon and a plurality of concentric circles 30 spaced apart substantially one millimeter. The chart has an area 31 corresponding to the area of the lens and has a fixed center 32 corresponding to the axis or center of the lens. It is apparent that by taking measurements along different given meridians and at given distances from the center 32 in each meridian the entire area of the surface of the eye with which the lens is to be fitted may be measured. The thickness at each point of measurement, of course, will have to be recorded. In this manner the surface curvature of the eyeball may be obtained. The contacting portion of the lens to be fitted to the eye is shaped according to these findings so as to properly fit the eye, that is, it is shaped so as to compensate for the irregularities determined by said measurement so that the inner surface of the actual lens to be permanently used with the eye will depart from a true spherical curvature by the amounts which the surface of the eye departs from the inner spherical surface of the test lens. The plotting device, illustrated in Fig. VI and described above, is only one of many different devices which might be used; as, for example, it is conceived that a chart having a plurality of squares, in which measurements taken corresponding to the position of said squares relative to each other, might be used.

It is to be understood that the above is set forth only by way of illustration of means and method by which the shape of the surface of the eye may be determined. By this it is meant that a different type of intensity chart and a different layout or plotting of the area of the eye, so as to obtain the thickness of the liquid at different given points, may be used.

Having obtained the shape of the surface of the eye the shape of the inner surface of the contact lens to be fitted may be made.

More accurate measurements may be made by instrumentation. To diagrammatically illustrate how this may be performed, as shown in Fig. V, a commercial slit lamp comprising a source of illumination 11 may be projected through means 12 for forming a slit-like image. This means 12 may be so constructed as to vary the width and size of slit and also may be rotatable so as to change the angular position of the slit and thereby vary the angle of the image on the eye.

A suitable lens system 13 is used for projecting the image on the eye. The focal position of the image may be varied by shifting the lens 13 rearwardly and forwardly in the directions indicated by the arrows 14. As the light traverses the liquid, a band of light equal to the thickness of the liquid, as indicated at 15, is produced. A similar band of light is produced by the thickness of the outer layer of the eye as illustrated at 16. This outer layer of the eye is of a substantially constant known thickness and the thickness of the band of light produced by the liquid 8 may be approximated by comparing said thickness with the adjacent thickness 16. It is apparent that if the thickness 15 is substantially the same as the thickness 16 it is safe to assume it is of the substantially constant known thickness 16. If the band 15 is less than the width of the band 16 a close approximation may be made, that is, the band 15 might be ⅞ of the thickness 16, ¾ or ⅓. Likewise the larger dimensions might be similarly approximated. A more accurate method of determining the thickness of the band 15 is to utilize a microscope such as shown diagrammatically at 17. This microscope is of the commonly known type having a suitable objective that may be adjusted by a hand wheel 18 through a rack and gear connection 19 and 20 or other suitable means. The observer's eye is located at 21. A suitable scale 22 and indicator 23 might be associated with the adjustable objective so that when the objective is moved to different focal positions the amount of adjustment may be determined. The thickness of the band 15 may be positively measured by first focusing on the edge 24 of said band, noting the position of the indicator on the scale, and then focusing on the opposed edge 25 of the band and thereafter reading the position of the indicator 23 on the scale 22. In this manner the scale will directly indicate the width of the band and thereby the thickness of the liquid at said point. A plurality of such measurements may be taken at given positions throughout the area to be measured so that the entire area may be covered and measurements at several different points can be recorded and the inner surface of the lens thereafter formed according to said measurements.

It is to be understood that the slit lamp projector is of a commercially known type and is shown only diagrammatically, that it, it might comprise different objectives or focusing systems or a different arrangement of slit image producing means as, for example, there may be a slit screen 26 placed adjacent the focusing lens system 13.

This type of instrument is well know in the art and it is the intention of this invention to include any of the well known commercial slit lamp devices. It is also to be undersood that the microscope shown herein is only diagrammatic and that any commercially known microscope may be used either monocular or binocular.

The color of the liquid would help the slit lamp measurement.

The gist of the invention as regards obtaining measurements by instrumentation is to use a commercial slit lamp and measure directly the beam of light. In most instances, however, the shade differences as noted by the eye would be near enough and a slit lamp would not be needed, as with experience one could tell the deviation by the shade differences, which would be a near enough approximation. Such a difference being obtained through the use of a chart such as illustrated in Fig. IV.

With this arrangement one could determine rapidly the axis of a toric surface or other variable curvature.

In the use of the slit lamp a small beam of light (a pencil of light) is directed at will in the direction desired. With this pencil of light directed through the medium at a desired point, one can take a commercial microscope and focus the reflection dots or spots from the different surfaces and measure the focus on the scale of the microscope. The axis of the toric surface might be obtained by rotating the slit image producing means 12 or 26 so as to position the same substantially parallel with the axis of a toric surface or other variable curvature. A suitable scale and indicator arrangement 27 might be associated with the slit image producing means for indicating the axis thereof and in this manner the axis of a toric surface or other variable surface could be definitely determined.

It is noted that the beam of light diagrammatically illustrated by the line 28 in Fig. V is projecteed through the medium 8 and adjacent layer or layers of the eye and the width of the beam passing through said liquid or outer layer of the eye is viewed at an angle either directly or by means of a microscope or other suitable means.

From the foregoing it will be seen that I have provided simple, efficient and economical means and method for obtaining all of the objects and advantages of the invention.

It is to be understood that the protractor scale extends throughout the entire 360° of the plotting device.

Having described my invention, I claim:

1. The method of determining the variation of curvature of the eyeball comprising positioning a transparent member simulating a contact lens having a sclera bearing portion of a known inner curvature over the eye with a colored liquid between the eye and the bearing surfaces of the lens and comparing the variation in shade of the liquid at different given points on said transparent member with a shade check chart which is calibrated adjacent each color to indicate the thickness represented thereby to determine the thickness of said liquid at said points, and, therefore, the curvature necessary to properly fit a contact lens to the eye.

2. The method of obtaining a substantially uniform fit of a contact type lens with a given supporting surface area of the eye comprising placing, on an eye, a transparent member simulating a contact lens having an inner known preshaped surface portion adapted to overlie the supporting surface area of the eye, determining, at given selected locations throughout said supporting surface area, the related relation of the inner preshaped surface of the lens with the surface plane of said supporting area of the eye to obtain departures of said inner surface of the lens from the shape of the surface of the supporting area of the eye at said selected locations and substantially altering the shape of the inner surface portion of a lens which is adapted to overlie the supporting area of the eye according to said determinations so as to obtain a substantially equal surface pressure contact with the eye throughout said supporting area.

3. The method of fitting a contact lens to an eye comprising providing a contact lens having a sclera bearing portion of a known surface curvature, placing said lens on the eye with a colored liquid between the eye and said bearing portion, providing a readily movable test scale having color graduations with related thickness indications, and a plotting chart simulating the area of the eye being checked, moving said test scale to various given points of said lens simulating similar points on said plotting chart while in position on said eye, noting the variations of color of said liquid at said different points due to variations of the distance between the lens and the eye, and the corresponding thicknesses indicated by said color variations, plotting a curve of said thicknesses at corresponding points on said plotting chart, and calculating the curvature necessary to the scleral portion of a lens to provide an accurate fit from said plotted curve.

PAUL A. K. BOEDER.